(12) United States Patent
Michl et al.

(10) Patent No.: US 10,589,476 B2
(45) Date of Patent: Mar. 17, 2020

(54) METHOD AND DEVICE FOR PRODUCING A THREE-DIMENSIONAL FIBER COMPOSITE COMPONENT

(71) Applicant: Bayerische Motoren Werke Aktiengesellschaft, Munich (DE)

(72) Inventors: Sebastian Michl, Aichach (DE); Oleg Konrad, Ergolding (DE); Thomas Hogger, Otterfing (DE); Michael Kolbinger, Essenbach (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 310 days.

(21) Appl. No.: 15/460,250

(22) Filed: Mar. 16, 2017

(65) Prior Publication Data

US 2017/0190122 A1    Jul. 6, 2017

Related U.S. Application Data

(63) Continuation of application No. PCT/EP2015/066538, filed on Jul. 20, 2015.

(30) Foreign Application Priority Data

Sep. 18, 2014    (DE) .................. 10 2014 218 799

(51) Int. Cl.
*B29C 70/24* (2006.01)
*B29C 33/42* (2006.01)
(Continued)

(52) U.S. Cl.
CPC .............. *B29C 70/24* (2013.01); *B29C 33/42* (2013.01); *B29C 70/46* (2013.01); *B29K 2105/08* (2013.01); *B29L 2031/7739* (2013.01)

(58) Field of Classification Search
CPC ..... B29K 2105/08; B29C 33/42; B29C 70/46; B29C 70/24; B29C 70/02
(Continued)

(56) References Cited

U.S. PATENT DOCUMENTS

2002/0153084 A1    10/2002    Johnson et al.
2008/0099131 A1*    5/2008    Umeda ................ B29C 66/524
                                                              156/201
(Continued)

FOREIGN PATENT DOCUMENTS

CN    1509224 A    6/2004
CN    101815606 A    8/2010
(Continued)

OTHER PUBLICATIONS

International Search Report (PCT/ISA/210) issued in PCT Application No. PCT/EP2015/066538 dated Oct. 20, 2015 with English translation (Four (4) pages).
(Continued)

*Primary Examiner* — Philip C Tucker
*Assistant Examiner* — Vicki Wu
(74) *Attorney, Agent, or Firm* — Crowell & Moring LLP

(57) ABSTRACT

A method for producing a three-dimensional fiber composite component with fiber bundles which are shaped from a rod- or strand-like initial shape into a predetermined three-dimensional shape of the component by way of a shape defining apparatus. The shape defining apparatus has at least one shaping channel having a first curvature along its longitudinal direction, which is predetermined for the fiber composite component, and forms at least one leading edge. The fiber bundles are pressed against the at least one leading edge of the shaping channel, thereby adopting the predetermined first curvature.

7 Claims, 2 Drawing Sheets

(51) Int. Cl.
*B29C 70/46* (2006.01)
*B29L 31/00* (2006.01)
*B29K 105/08* (2006.01)

(58) Field of Classification Search
USPC ........................................................ 156/245
See application file for complete search history.

(56) References Cited

U.S. PATENT DOCUMENTS

| | | | |
|---|---|---|---|
| 2009/0078362 A1* | 3/2009 | Wilkerson | B29C 70/52 156/201 |
| 2010/0186882 A1 | 7/2010 | Edelmann et al. | |
| 2013/0142997 A1* | 6/2013 | Hofmann | B29C 70/504 428/156 |
| 2018/0311872 A1* | 11/2018 | Hogger | B29C 45/0005 |

FOREIGN PATENT DOCUMENTS

| | | | |
|---|---|---|---|
| DE | 10 2010 002 988 A1 | 9/2011 | |
| DE | 102010002988 A1 * | 9/2011 | ........... B29C 70/504 |
| DE | 10 2010 023 669 A1 | 12/2011 | |
| DE | 10 2013 219 820 A1 | 4/2015 | |
| EP | 2 006 074 A1 | 12/2008 | |
| EP | 2006074 A1 * | 12/2008 | ........... B29C 43/203 |
| WO | WO 2015/043845 A1 | 4/2015 | |

OTHER PUBLICATIONS

German-language Written Opinion (PCT/ISA/237) issued in PCT Application No. PCT/EP2015/066538 dated Oct. 20, 2015 (Four (4) pages).

German-language Search Report issued in counterpart German Application No. 10 2014 218 799.0 dated May 5, 2015 with partial English translation (Twelve (12) pages).

Chinese-language Office Action issued in counterpart Chinese Application No. 201580032084.X dated May 3, 2018 with English translation (nine (9) pages).

English translation of Chinese-language Office Action issued in counterpart Chinese Application No. 201580032084.X dated Jan. 22, 2019 (six (6) pages).

\* cited by examiner

# METHOD AND DEVICE FOR PRODUCING A THREE-DIMENSIONAL FIBER COMPOSITE COMPONENT

CROSS REFERENCE TO RELATED APPLICATIONS

This application is a continuation of PCT International Application No. PCT/EP2015/066538, filed Jul. 20, 2015, which claims priority under 35 U.S.C. § 119 from German Patent Application No. 10 2014 218 799.0, filed Sep. 18, 2014, the entire disclosures of which are herein expressly incorporated by reference.

BACKGROUND AND SUMMARY OF THE INVENTION

The invention relates to a method for producing a three-dimensional fiber composite component using fiber bundles.

Various production variants for fiber-reinforced plastic components are known from the prior art, inter alia a CFRP shell design, CFRP woven design, or CSMC design. Furthermore, production methods with hollow profiles or the use of sheet metal shells have been known for a long time. Despite continuous development and adaptation even to mass production, the components which are produced in the process are comparatively expensive and/or heavy.

German patent application DE 10 2013 219 820 A1 describes a method for producing a fiber composite component using fiber bundles, as a result of which weight and costs can be saved. It is provided here, for connecting fiber bundles with a matrix made from thermoplastic and/or thermosetting material, that they form a profile and bracing means are arranged between the fiber bundles.

In the known method, fiber bundles have to be reshaped in different directions and with different curvatures, in order to ensure the predetermined component shape.

It is an object of the present invention to provide a method, by way of which the fiber bundles can be reshaped easily, inexpensively, and with as little use of tools as possible. Furthermore, a reshaping device is to be provided, by way of which fiber bundles can be reshaped three-dimensionally more rapidly and without an additional use of tools.

These and other objects are achieved by way of a method and an apparatus in accordance with embodiments of the invention.

Here, according to the invention, a method for producing a three-dimensional fiber composite component with fiber bundles is provided in principle, the fiber bundles being reshaped from a rod-shaped or strand-shaped initial form into a three-dimensional predetermined component shape via a shape defining apparatus. The shape defining apparatus comprises at least one reshaping channel which has a first curvature which is predetermined for the fiber composite component along its longitudinal direction and configures at least one leading edge. The fiber bundles are pressed against the at least one leading edge of the reshaping channel and, in the process, adopt the predetermined first curvature. The predetermined first curvature corresponds to a curvature along the longitudinal extent of the fiber bundle. The leading edge is formed by way of a lateral outer wall of the reshaping channel.

In addition, the method according to the invention is distinguished by a reshaping operation in a further direction which is substantially perpendicular with respect to the first direction. For this purpose, a shaping edge is configured along the reshaping channel on the bottom side, against which shaping edge the fiber bundles are pressed and, in the process, adopt a predetermined second curvature for the fiber composite component. The first and second curvature are brought about, for example, in the X- and Z-direction in the reshaping channel, the fiber bundles extending in the Y-direction and all directions lying perpendicularly with respect to one another. The method steps are then formed by a fiber bundle first of all being fed to a reshaping channel of the shape defining apparatus, subsequently being pressed against the leading edge of the reshaping channel, and finally being pressed against the bottom-side shaping edge. The result is that a three-dimensional final shape of the respective fiber bundle is set. The movement directions are preferably in each case perpendicular with respect to one another, that is to say the feeding of the fiber bundle takes place in the Z-direction, the pressing onto the leading edge takes place in the X-direction and the pressing onto the shaping edge again takes place in the Z-direction.

It is favorable here that tool devices such as slides and the like are not additionally required, as a result of which the production costs can be reduced.

In one exemplary embodiment, the leading edge forms a step with respect to a feed section, with the result that the fiber bundle can be introduced into the reshaping channel and can subsequently be pressed against the leading edge.

In one favorable embodiment, the fiber bundles are impregnated with resin or are resin-impregnated thermoplastic fiber bundles. Furthermore, the fiber bundles are preferably formed from endless fibers and with glass fibers or carbon fibers. The fiber bundles can be configured with a round, rectangular or square cross section and, in the latter case, have a size of approximately 10×10 mm.

Final finishing of the fiber composite component with the three-dimensionally reshaped fiber bundles which have the first and second curvature takes place in a conventional press tool.

The invention also includes the simultaneous reshaping of a plurality of fiber bundles, the shape defining apparatus having a plurality of reshaping channels for this purpose. Here, the reshaping channels can extend substantially in parallel along the X-direction of the shape defining apparatus. The fiber bundles can be held via a tensioning frame and can be fed to the individual reshaping channels. It is advantageous here that a multiplicity of fiber bundles can be set into the final shape more rapidly and a plurality of components can be reshaped in one tool.

Furthermore, it is provided in one embodiment of the invention that the plurality of reshaping channels of the shape defining apparatus have different first curvatures and/or leading edges with different second curvatures, with the result that a plurality of fiber bundles are reshaped at the same time into different three-dimensional shapes for the three-dimensional fiber composite component. The different structures make any desired shape of the fiber composite component in 3D possible.

Furthermore, the invention includes the shape defining apparatus for rod-shaped or strand-shaped fiber bundles for three-dimensional reshaping of the fiber bundles and an above-described embodiment. The shape defining apparatus is advantageously distinguished by the fact that fiber bundles can be reshaped three-dimensionally in at least one or two directions without additional tools.

Other objects, advantages and novel features of the present invention will become apparent from the following detailed description of one or more preferred embodiments when considered in conjunction with the accompanying drawings.

BRIEF DESCRIPTION OF THE DRAWINGS

The figures are diagrammatic by way of example. Identical designations denote identical parts in all views.

DETAILED DESCRIPTION OF THE DRAWINGS

Figure 1:
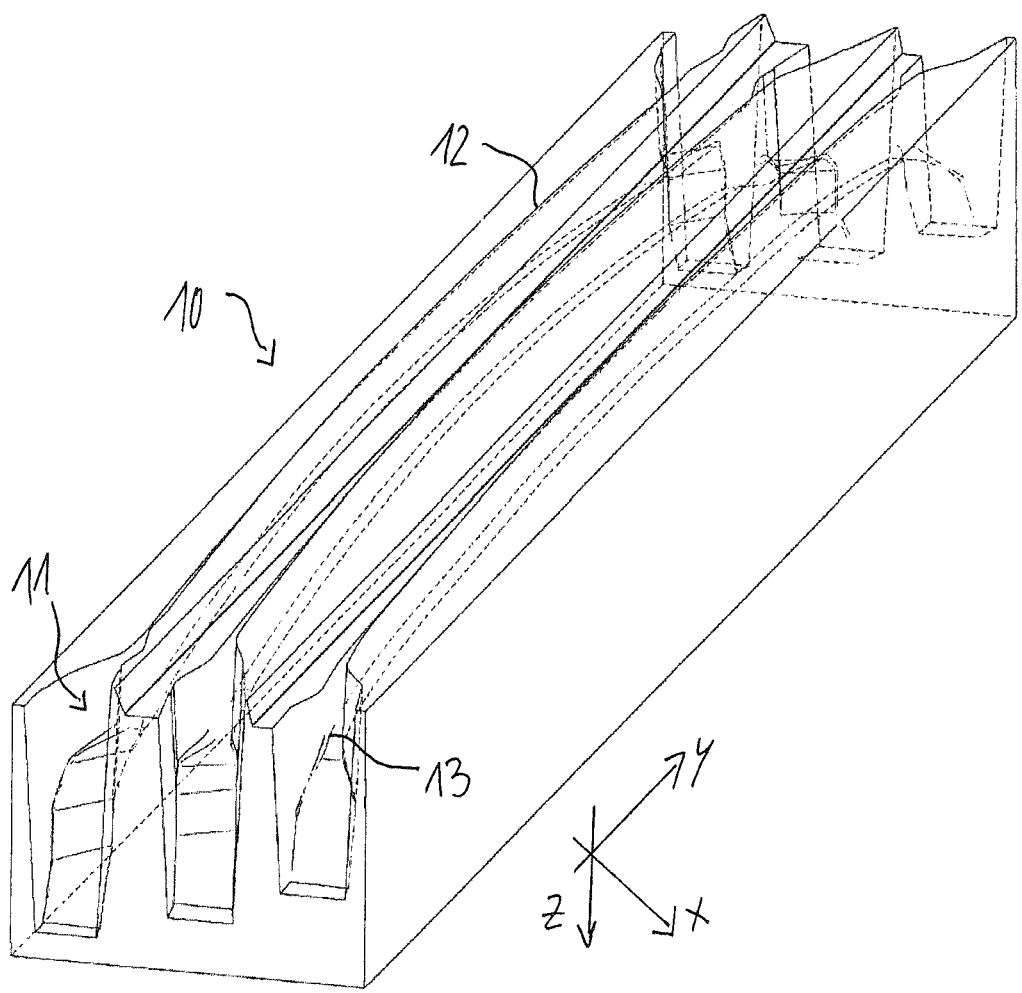
FIG. 1 is a perspective view of a shape defining apparatus according to an embodiment of the invention.
Figure 2:
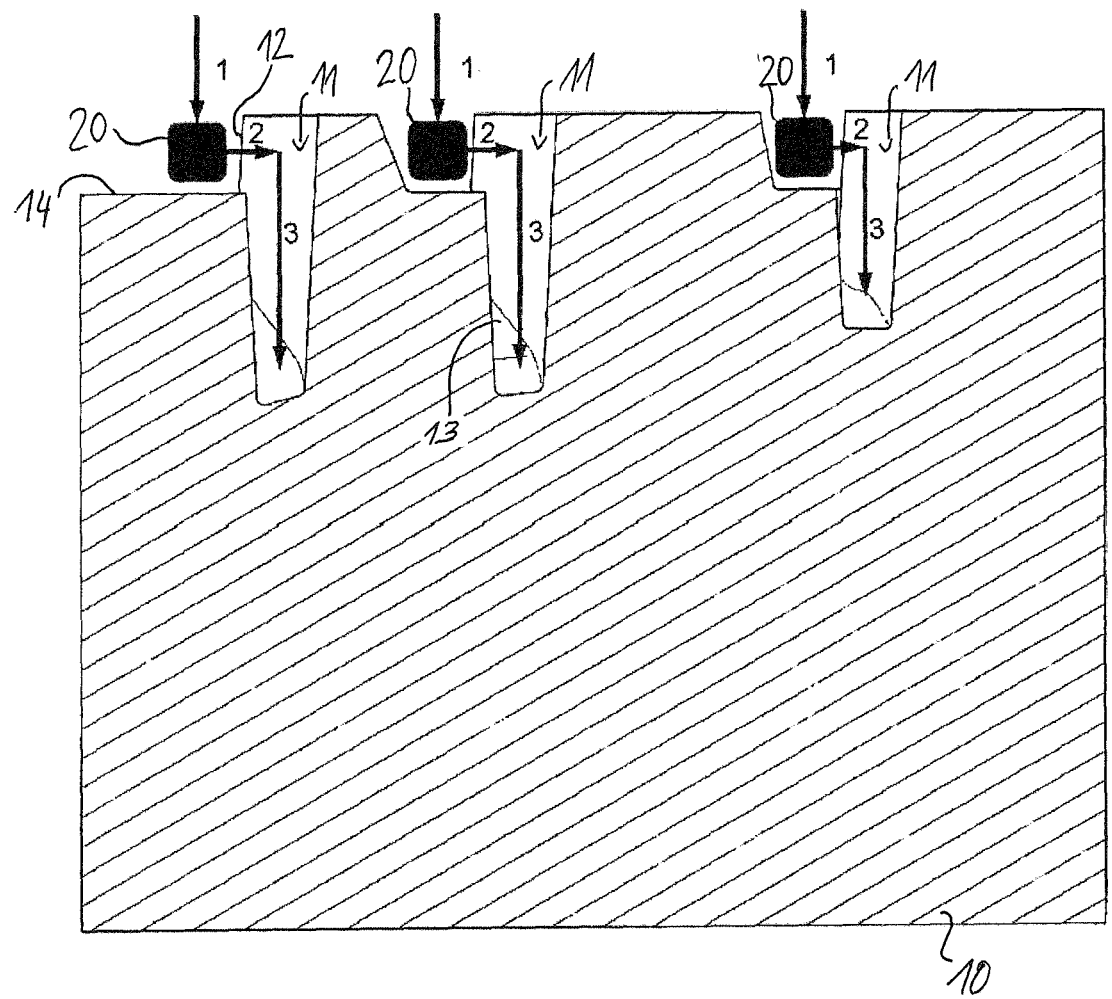
FIG. 2 is a sectional view of the shape defining apparatus for illustrating an exemplary method of a reshaping operation.

FIG. 1 is a perspective view of the shape defining apparatus 10 with three reshaping channels 11 which extend in the Y-direction and, by way of which, fiber bundles 20, as shown in FIG. 2, are reshaped three-dimensionally in three steps 1, 2, 3. The reshaping channels 11 have, in each case, one leading edge 12 which is curved arcuately in the X-direction along their longitudinal direction (Y-direction). In the embodiment which is shown, the arcuate shape extends substantially over the entire length of the reshaping channels 11, but it can also be of shorter configuration. On the bottom side, each reshaping channel 11 has a shaping edge 13 which is likewise curved arcuately substantially over the entire length of the reshaping channel 11, but in the Z-direction. The two curvatures determine the final shape of the desired fiber composite component.

FIG. 2 shows, by way of example, the steps of the reshaping process using the shape defining apparatus 10 with, by way of example, three reshaping channels. In a first step 1, the fiber bundles 20 are moved in the Z-direction to the shape defining apparatus 10 into a region next to the reshaping channels 11. Subsequently, the fiber bindles 20 are pressed in the X-direction against the leading edge 12 in a second step 2. Finally, the fiber bundles 20 are moved in the Z-direction and pressed against the shaping edge 13. The result is that the fiber bundle 20 is deformed both in the X-direction and in the Z-direction. The shapes of the leading edge 12 and shaping edge 13 determine the component shape. Edge regions of the shaping edges 13 are configured correspondingly.

The fiber bundles 20 are impregnated with resin during the reshaping operation, are subsequently encapsulated with plastic, and are finally finished to form the finished fiber composite component by way of conventional methods which are known to a person skilled in the art, via a press tool. In the illustration which is shown, the fiber bundles 20 have a substantially square cross section with an edge length of approximately 10 mm. A plurality of fiber bundles 20 can be guided into a plurality of reshaping channels 11 at the same time using, for example, a tensioning frame, with the result that the above-described steps can be carried out at the same time on a multiplicity of fiber bundles 20.

In the exemplary embodiment which is shown, the leading edge 12 forms a step in the Z-direction with respect to the feed section 14, with the result that the fiber bundle 20 can be introduced completely into the reshaping channel 11 in the Z-direction and can subsequently be pressed against the leading edge 12 in the X-direction.

The realization of the invention is not restricted to the preferred exemplary embodiments specified above. Rather, a number of variants are contemplated which make use of the described solution even in the case of embodiments of fundamentally different types. For example, further edges can also be provided in the reshaping channel, in order to produce special geometries. The number of reshaping channels per shape defining apparatus is also not limited and can be adapted selectively, in so far as technically possible and appropriate.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a three-dimensional fiber composite component, the method comprising the acts of:
providing a shape defining apparatus having at least one stationary reshaping channel with a first curvature predetermined for the fiber composite component along a longitudinal direction and a predetermined second curvature, the first curvature configured as at least one leading edge at a first side of the at least one stationary reshaping channel, and the second curvature configured as a shaping edge at a second side of the at least one stationary reshaping channel;
pressing fiber bundles having a rod-shaped or strand-shaped initial form laterally relative to the longitudinal direction against a longitudinal length of the at least one leading edge of the at least one stationary reshaping channel such that the fiber bundles adopt the predetermined first curvature; and
pressing the fiber bundles transversely relative to the longitudinal direction against a longitudinal length of the shaping edge such that the fiber bundles adopt the predetermined second curvature for the fiber composite component.

2. The method according to claim 1, wherein the fiber bundles are impregnated with resin.

3. The method according to claim 1, wherein the fiber bundles are surrounded by thermoplastic.

4. The method according to claim 1, further comprising the act of:
joining together and finishing in a press tool the fiber bundles provided with the first and second curvature in a static pressing operation in order to form the three dimensional fiber composite component.

5. The method according to claim 1, wherein the at least one stationary reshaping channel is a plurality of stationary reshaping channels, in which a plurality of fiber bundles are reshaped at a same time.

6. The method according to claim 5, wherein
the plurality of stationary reshaping channels of the shape defining apparatus have different first curvatures and/or leading edges with different second curvatures, whereby the plurality of fiber bundles are reshaped at the same time into different three-dimensional shapes for the three-dimensional fiber composite component.

7. The method according to claim 1, wherein the reshaped fiber bundles are encapsulated with thermoplastic and/or thermosetting resin.

\* \* \* \* \*